United States Patent
Li

(10) Patent No.: US 11,292,553 B2
(45) Date of Patent: Apr. 5, 2022

(54) BICYCLE WITH A POWER ASSIST TRANSMISSION DEVICE

(71) Applicant: Yueh-Han Li, Taitung County (TW)

(72) Inventor: Yueh-Han Li, Taitung County (TW)

( * ) Notice: Subject to any disclaimer, the term of this patent is extended or adjusted under 35 U.S.C. 154(b) by 318 days.

(21) Appl. No.: 16/707,648

(22) Filed: Dec. 9, 2019

(65) Prior Publication Data

US 2020/0189686 A1 Jun. 18, 2020

(30) Foreign Application Priority Data

Dec. 13, 2018 (TW) .................................. 107145048

(51) Int. Cl.
  *B62M 6/55* (2010.01)
  *B62M 23/02* (2010.01)
  *B62M 6/50* (2010.01)

(52) U.S. Cl.
  CPC .............. *B62M 6/55* (2013.01); *B62M 23/02* (2013.01); *B62M 6/50* (2013.01)

(58) Field of Classification Search
  CPC .......... B62M 6/55; B62M 6/50; B62M 3/003; B62M 1/36; B62M 23/02; B62K 19/34
  USPC ........................... 74/594.1, 594.2; 180/206.4
  See application file for complete search history.

(56) References Cited

U.S. PATENT DOCUMENTS

| | | | | |
|---|---|---|---|---|
| 5,901,807 A * | 5/1999 | Tseng | ................... | B62M 11/145 |
| | | | | 180/206.3 |
| 6,230,586 B1 * | 5/2001 | Chang | ..................... | B62M 6/55 |
| | | | | 180/206.4 |
| 8,978,855 B2 * | 3/2015 | Wang | ..................... | F16D 13/04 |
| | | | | 192/34 |
| 11,167,817 B2 * | 11/2021 | Noda | ....................... | B62M 6/50 |
| 2012/0234118 A1 * | 9/2012 | Huang | ..................... | B62M 6/55 |
| | | | | 74/325 |
| 2018/0029667 A1 * | 2/2018 | Elliott | .................. | F16D 43/208 |
| 2018/0111660 A1 * | 4/2018 | Liu | ......................... | B62M 6/55 |
| 2018/0208268 A1 * | 7/2018 | Chen | ....................... | B62M 6/55 |
| 2018/0244342 A1 * | 8/2018 | MacMartin | ............. | B62M 6/55 |
| 2021/0147034 A1 * | 5/2021 | Wang | ..................... | B62M 11/02 |
| 2021/0284283 A1 * | 9/2021 | Cai | ........................ | B62M 6/55 |

FOREIGN PATENT DOCUMENTS

| CN | 202491901 | * | 10/2012 | ............ | B62M 3/00 |
| EP | 3666635 A1 | * | 6/2020 | ............ | B62M 23/02 |

* cited by examiner

*Primary Examiner* — Anne Marie M Boehler
(74) *Attorney, Agent, or Firm* — Birch, Stewart, Kolasch & Birch, LLP

(57) ABSTRACT

A bicycle includes a frame, and a transmission device including a motor, a transmission unit, a crank unit, a sprocket and a unidirectional bearing. The transmission unit includes a first gear driven by the motor, a one-way clutch mounted in a compartment of the frame and connected between the first gear and the motor for limiting rotation to be transmitted from the motor to the first gear, and a second gear meshing with the first gear. The crank unit includes a crank shaft extending into the second gear, and first and second cranks connected respectively to two ends of the crank shaft. The sprocket is formed with an engaging hole non-rotatably engages the second gear and a receiving groove receives the unidirectional bearing for driving rotation of the sprocket in a single direction.

5 Claims, 3 Drawing Sheets

BICYCLE WITH A POWER ASSIST TRANSMISSION DEVICE

CROSS-REFERENCE TO RELATED APPLICATION

This application claims priority of Taiwanese Invention Patent Application No. 107145048 filed on Dec. 13, 2018.

FIELD

The disclosure relates to a bicycle, more particularly to a bicycle including a power assist transmission device.

BACKGROUND

A conventional electric bicycle includes a pair of pedals, a pair of cranks connected respectively to the pedals, a bottom bracket, a driving sprocket for mounting of the cranks, and a power assist transmission device. The power assist transmission device includes a motor providing power assistance to the bicycle, and a one-way clutch connected to the motor and mounted to a sprocket plate of the driving sprocket for allowing rotation to be transmitted from the motor to sprocket plate while preventing rotation from being transmitted from the cranks to the motor. However, the one-way clutch is usually exposed outwardly of a frame body of the bicycle and may be damaged by moisture and dirt easily.

SUMMARY

Therefore, an object of the disclosure is to provide a bicycle including a power assist transmission device capable of alleviating at least the drawback of the conventional bicycle.

According to an aspect of the present disclosure, a bicycle including a bicycle frame and a power assist transmission device is provided. The bicycle frame is formed with an upright elongate compartment and a horizontal axial hole intersecting and in spatial communication with the compartment. The power assist transmission device includes a motor drive unit, a transmission unit, a crank unit, a driving sprocket and a unidirectional bearing. The motor drive unit is mounted in the compartment. The transmission unit includes a first gear, a one-way clutch, and a second gear. The first gear is driven by the motor drive unit to rotate. The one-way clutch is mounted in the compartment and is connected between the first gear and the motor drive unit for allowing rotation to be transmitted from the motor drive unit to the first gear while preventing rotation from being transmitted from the first gear to the motor drive unit. The second gear meshes with the first gear, is mounted in the axial hole, and includes an engaging portion having a non-circular profile. The crank unit includes a crank shaft, a first crank, and a second crank. The crank shaft is mounted rotatably in the axial hole, extends along an axis of the axial hole, and extends into the second gear along the axis. The first crank is connected to one end of the crank shaft, and includes a crank arm and an extending portion extending from the crank arm toward the second gear along the axis. The second crank is connected to the other end of the crank shaft. The driving sprocket has an inner side surface facing the axial hole and an outer side surface opposite to the inner side surface along the axis and facing the first crank, and is formed with a receiving groove and an engaging hole. The receiving groove extends from the outer side surface toward the inner side surface and receives at least a portion of the extending portion of the first crank therein. The engaging hole extends from the inner side surface toward the receiving groove, is in spatial communication with the receiving groove, non-rotatably engages the engaging portion, and has a diameter smaller than that of the receiving groove. The unidirectional bearing is mounted in the receiving groove and is sleeved on the extending portion of the first crank for driving rotation of the driving sprocket in a single direction by the extending portion.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
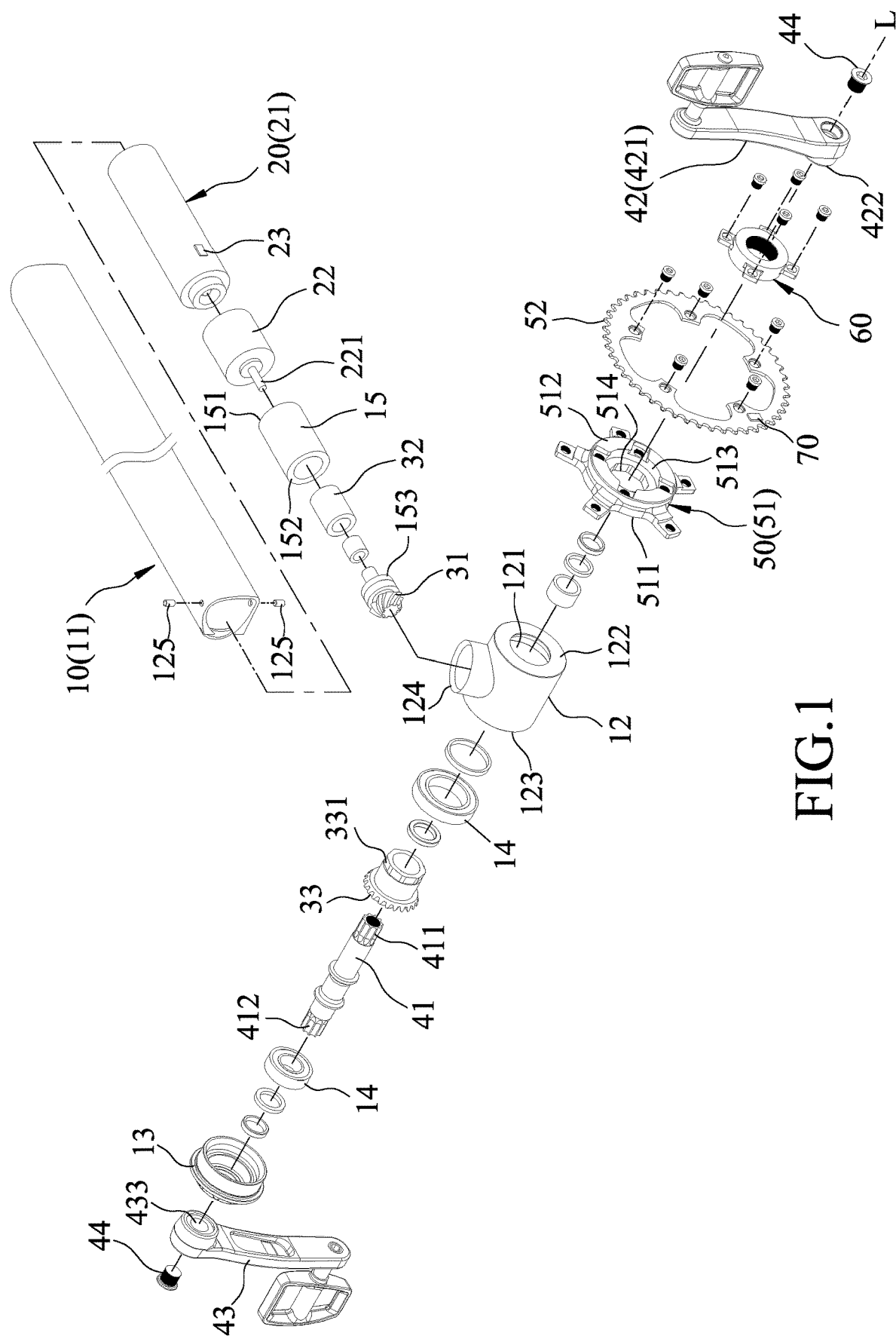
FIG. 1 is an exploded perspective view of a portion of a bicycle frame and a power assist transmission device of a bicycle according to one embodiment of the present disclosure.
Figure 2:
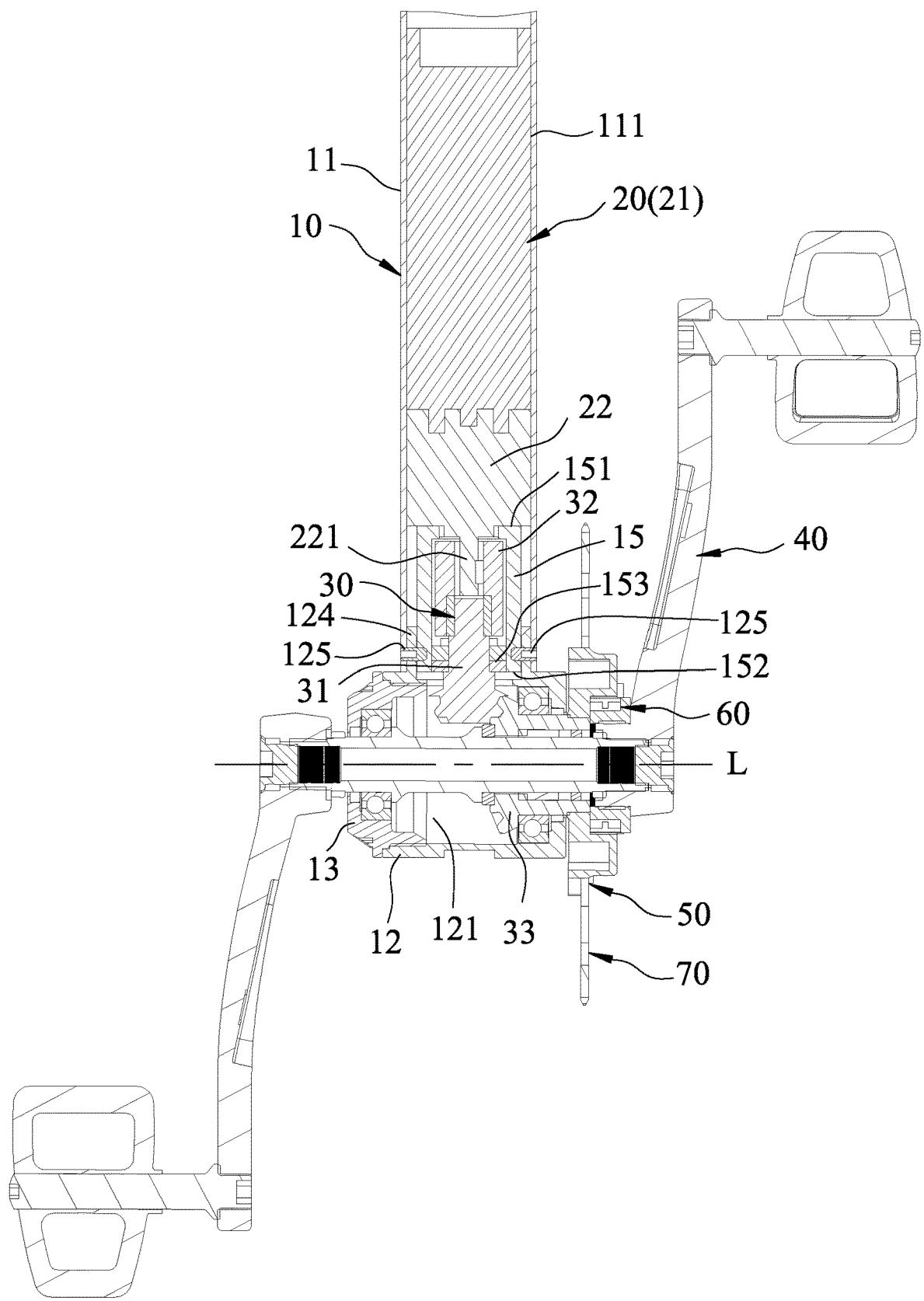
FIG. 2 is a fragmentary sectional view of the bicycle frame and the power assist transmission device according to the embodiment of the present disclosure.
Figure 3:
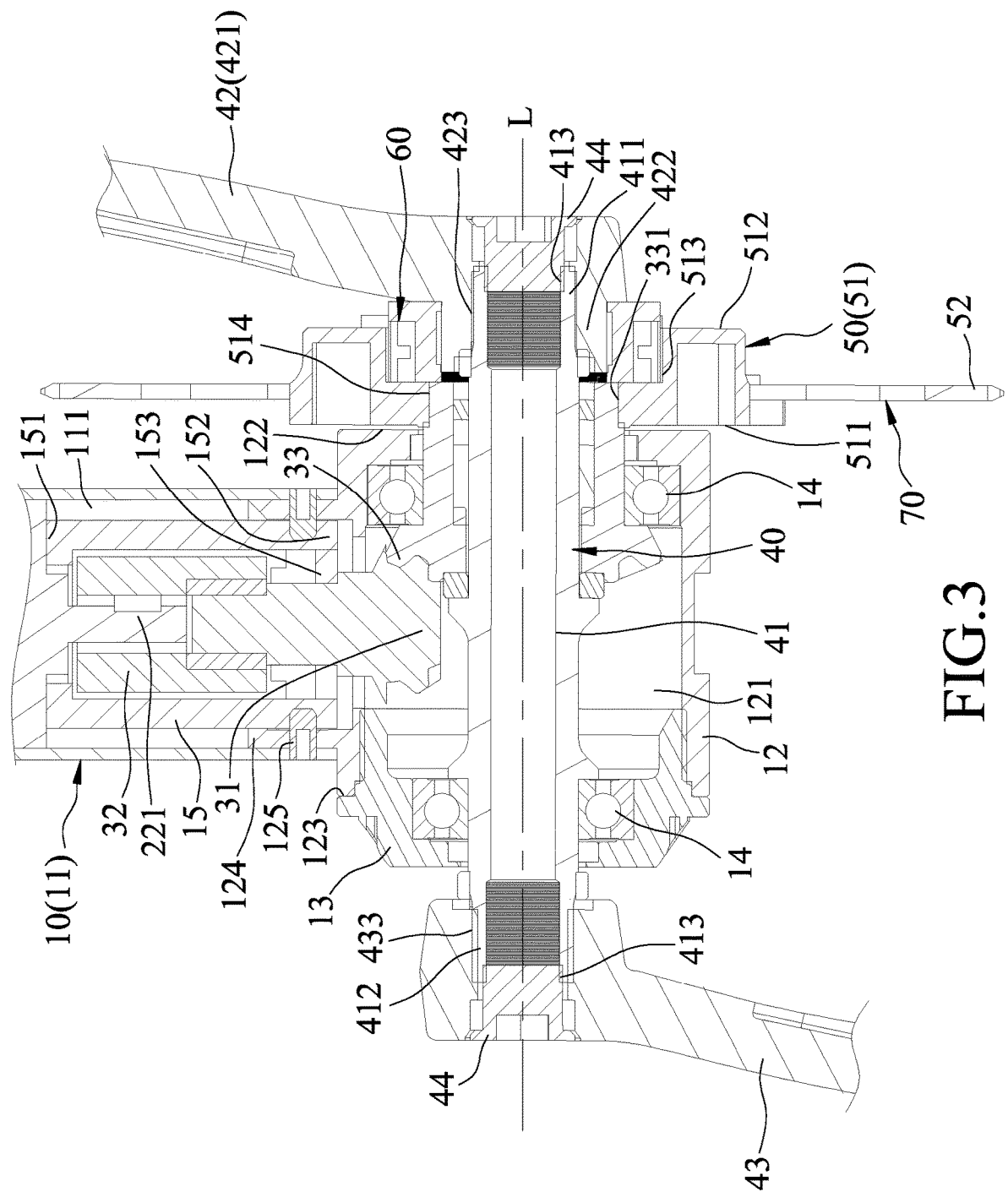
FIG. 3 is an enlarged schematic sectional view of a portion of FIG. 2.

Referring to FIGS. 1 to 3, a bicycle includes a bicycle frame 10 (only a portion is shown) and a power assist transmission device. The power assist transmission device includes a motor drive unit 20, a transmission unit 30, a crank unit 40, a driving sprocket 50, a unidirectional bearing 60, and a sensor 70.

The bicycle frame 10 includes a seat tube 11, a bottom bracket tube 12, an end cap 13, two bearings 14 and a sleeve 15. The seat tube 11 defines an upright elongate compartment 111. The bottom bracket tube 12 intersects the seat tube 11 and defines a horizontal axial hole 121 extending along an axis (L), and intersecting and in spatial communication with the compartment 111. The bottom bracket tube 12 includes a protruding portion 124 extending transversely to the axis (L) into the seat tube 11, and a plurality of fastening members 125 interconnecting the protruding portion 124 and the seat tube 11. The bottom bracket tube 12 has a first end surface 122 and a second end surface 123 that is opposite to the first end surface 122 along the axis (L).

The end cap 13 is sleeved on the bottom bracket tube 12 and covers the second end surface 123 of the bottom bracket tube 12. The bearings 14 are respectively disposed in the bottom bracket tube 12 and the end cap 13. The sleeve 15 is disposed in the compartment 111 and is fastened to the seat tube 11 by the fastening members 125. The sleeve 15 has a first end surface 151 and a second surface 152 opposite to the first end surface 151 and includes a sealing member 153 disposed near to the second end surface 152.

The motor drive unit 20 is mounted in the compartment 111 and includes a motor 21, a decelerator 22 driven by the motor 21, and a controller 23 electrically connected to the motor 21 and the decelerator 22 for controlling operations of the motor 21 and the decelerator 22. The decelerator 22 includes a transmission shaft 221 for transmitting rotational power from the motor 21 to the transmission unit 30. The first end surface 151 of the sleeve 15 abuts against the decelerator 22. Note that FIG. 1 is a schematic view illustrating a portion of the bicycle frame 10 and the bicycle frame 10 of the present disclosure may include well known elements of a bicycle frame.

The transmission unit 30 includes a first gear 31, a one-way clutch 32, and a second gear 33. The first gear 31 is driven by the motor drive unit 20 to rotate. The one-way clutch 32 is mounted in the compartment 111, and is connected between the first gear 31 and the transmission shaft 221 of the motor drive unit 20 for allowing rotation to be transmitted from the motor drive unit 20 to the first gear 31 while preventing rotation from being transmitted from the first gear 31 to the motor drive unit 20. The second gear 33 meshes with the first gear 31, is mounted in the axial hole 121, and includes an engaging portion 331 having a non-circular profile. One of the bearings 14 is sleeved on and supports the second gear 33. In this embodiment, the first gear 31 and the second gear 33 are both bevel gears, and the engaging portion 331 of the second gear 33 has an octagonal profile and extends outwardly from the first end surface 122 of the bottom bracket tube 12. The sleeve 15 is sleeved on the one-way clutch 32 and an upper portion of the first gear 31. The sealing member 153 is sleeved on the upper portion of the first gear 31 to seal the one-way clutch 32 in the sleeve 15 so as to prevent the one-way clutch 32 from getting dirty and being damaged by water and mud.

The crank unit 40 includes a crank shaft 41, a first crank 42, a second crank 43 and two fasteners 44. The crank shaft 41 is mounted rotatably in the axial hole 121, extends along the axis (L), and extends into the second gear 33 along the axis (L) and through one of the bearings 14 that is disposed in the end cap 13 so as to be supported thereby. The crank shaft 41 includes a first connecting portion 411 and a second connecting portion 412. The first connecting portion 411 extends outwardly of the second gear 33, and is connected co-rotatably to the first crank 42. The second connecting portion 412 is opposite to the first connecting portion 411 along the axis (L). The crank shaft 41 is formed with two threaded holes 413 (see FIG. 3) respectively at the first and second connecting portions 411, 412.

The first crank 42 is connected to one end of the crank shaft 41 and corresponds in position to the first end surface 122 of the bottom bracket tube 12. The first crank 42 includes a crank arm 421 and an extending portion 422. The extending portion 422 extends from the crank arm 421 toward the second gear 33 along the axis (L) and is connected co-rotatably to the first connecting portion 411. The first crank 42 is formed with a through hole 423 extending along the axis (L) and through the crank arm 421 and the extending portion 422.

The second crank 43 is connected to the other end of the crank shaft 41, corresponds in position to the second end surface 123 of the bottom bracket tube 12 and is formed with a through hole 433 allowing the second connecting portion 412 of the crank shaft 41 to extend therethrough.

The fasteners 44 respectively extend through the first crank 42 and the second crank 43 to fasten the same respectively to the first connecting portion 411 and second connecting portion 412 of the crank shaft 41. Specifically, one of the fasteners 44 extends through the through hole 423 of the first crank 42 and threadedly engages one of the threaded holes 413 formed in the first connecting portion 411, and the other one of the fasteners 44 extends into the key hole 433 of the second crank 43 and threadedly engages the other one of the threaded holes 413 formed in the second connecting portion 412.

The driving sprocket 50 includes a positioning seat 51 sleeved co-rotatably on the engaging portion 331 of the second gear 33, and a sprocket plate 52 connected fixedly to the positioning seat 51. The positioning seat 51 has an inner side surface 511, an outer side surface 512, and is formed with a receiving groove 513 and an engaging hole 514. The inner side surface 511 faces the axial hole 121 and is disposed adjacent to the first end surface 122 of the bottom bracket tube 12. The outer side surface 512 is opposite to the inner side surface 511 along the axis (L) and faces the first crank 42. The receiving groove 513 extends from the outer side surface 512 toward the inner side surface 511, corresponding in position to the first connecting portion 411 of the crank shaft 41, and receives at least a portion of the extending portion 422 of the first crank 42 therein and at least a portion of the first connecting portion 411 of the crank shaft 41. The engaging hole 514 extends from the inner side surface 511 toward the receiving groove 513, is in spatial communication with the receiving groove 513, non-rotatably engages the engaging portion 331 of the second gear 33, and has a non-circular profile and a diameter smaller than that of the receiving groove 513. In this embodiment, the engaging hole 514 has an octagonal profile complementary to that of the engaging portion 331 of the second gear 33.

The unidirectional bearing 60 is mounted in the receiving groove 513 and is sleeved on the extending portion 422 of the first crank 42 for driving rotation of the driving sprocket 50 in a single direction by the extending portion 422. In this embodiment, the unidirectional bearing 60 is a ratchet device allowing power transmission in only one direction. Since the operation of the ratchet device is well known in the pertinent art and thus further details of the same are omitted for the sake of brevity.

The sensor 70 is electrically connected to the controller 23, and can be mounted in the crank unit 40 or the driving sprocket 50 for sensing a pedaling torque exerted on the crank unit 40. In this embodiment, the sensor 70 is mounted in the sprocket plate 52 of the driving sprocket 50 for sensing a pedaling torque transmitted from the extending portion 422 of the first crank 42 to the positioning seat 51, and is configured to output a signal indicating the pedaling torque sensed thereby to the controller 23. The controller 23 is configured to control operation of the motor 21 and the decelerator 22 according to the signal received from the sensor 70. Since the main feature of the present disclosure does not reside in how the controller 23 controls the motor 21 according to the pedaling torque, further details of the same are omitted for the sake of brevity.

Note that the term "controller" may refer to any device or portion of a device that processes electronic data from registers and/or memory to transform that electronic data into other electronic data. For example, the controller 23 is, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

When the motor 21 is turned on to provide driving power to the bicycle, the motor 21 sequentially drives the first gear 31, the second gear 33, and the positioning seat 51 of the driving sprocket 50 to rotate. At this time, the unidirectional bearing 60 is driven by the positioning seat 51 to rotate and idle in the positioning seat 51. That is to say, rotation of the positioning seat 51 cannot be transmitted to the extending portion 422 of the first crank 42, and thus the first crank 42 and the second crank 43 do not rotate when the bicycle is driven by the motor 21. In this way, the safety of the user using the bicycle can be ensured.

On the other hand, when the user exerts a pedaling force on the first and second cranks 42, 43 to drive the bicycle and when the motor 21 is not turned on to provide rotational power, the extending portion 422 of the first crank 42 is rotated to drive rotation of the positioning seat 51 via the unidirectional bearing 60. Thus, the second gear 33 is co-rotated with the positioning seat 51 and drives the first gear 31 to rotate. By virtue of the one-way clutch 32, transmission from the first gear 31 to the motor 21 is prevented and thus the motor 21 would not be driven to rotate when the user exerts a pedaling force on the first and second cranks 42, 43. In this way, when the pedaling force exerted by the user serves as driving power of the bicycle, a resistance provided by the motor 21 to the pedaling force can be prevented.

In one embodiment, when the motor 21 is desired to be operated to facilitate movement of the bicycle, the user first pedals the first and second cranks 42, 43 to rotate, so that the sensor 70 outputs a signal indicating a pedaling torque sensed thereby to the controller 23. Then, when the controller 23 determines that the pedaling torque exceeds a predetermined threshold, for example, the user has pedaled the first and second cranks 42, 43 for a few circles or a few seconds to provide sufficient pedaling torque, it outputs a driving signal for driving the motor 21 to start to rotate. At this time, as described above, the motor 21 drives the driving sprocket 50 to rotate and drives the bicycle to continue to move, such that the first and second cranks 42, 43 are not driven to rotate.

In this way, when the bicycle is driven by one of the motor 21 and pedaling of the first and second cranks 42, 43 by the user, the other one of the motor 21 and the pedaling of the first and second cranks 42, 43 would not be interfered. Additionally, a brake (not shown) can be provided to slow down rotation of the motor 21. Therefore, the bicycle of the present disclosure can be used as a general bicycle when no electricity is provided to the motor 21, and can be used as an electric bicycle when the motor 21 serves as an assisting power source while the first and second cranks 42, 43 are remained idle so that the safety of the user using the bicycle can be ensured.

In sum, the advantages of the present disclosure are described in the following. By virtue of the engaging hole 514 of the positioning seat 51 non-rotatably engaging the engaging portion 331 of the second gear 33, the extending portion 422 of the first crank 42 disposed in the receiving groove 513, and the unidirectional bearing 60 disposed between the extending portion 422 and the driving sprocket 50, the first crank 42 can directly drive the unidirectional bearing 60 and the driving sprocket 50 to rotate and thus a relatively good power transmission is obtained.

Further, the configurations of the extending portion 422 of the first crank 42 extending into the receiving groove 513, a portion of the first connecting portion 411 of the crank shaft 411 corresponding in position to the receiving groove 513, and the unidirectional bearing 60 being mounted in the receiving groove 513 provide a relatively compact structure of the bicycle. Finally, the sleeve 15 covers the one-way clutch 32 and thus prevents the one-way clutch 32 from being damaged by water and mud.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A bicycle comprising a bicycle frame formed with an upright elongate compartment and a horizontal axial hole intersecting and in spatial communication with said compartment, and a power assist transmission device, said transmission device including:
   a motor drive unit mounted in said compartment;
   a transmission unit including a first gear driven by said motor drive unit to rotate, a one-way clutch mounted in said compartment and connected between said first gear and said motor drive unit for allowing rotation to be transmitted from said motor drive unit to said first gear while preventing rotation from being transmitted from said first gear to said motor drive unit, and a second gear meshing with said first gear, mounted in said axial hole, and including an engaging portion having a non-circular profile;
   a crank unit including a crank shaft that is mounted rotatably in said axial hole, that extends along an axis of said axial hole, and that extends into said second gear along the axis, a first crank that is connected to one end of said crank shaft, and that includes a crank arm and an extending portion extending from said crank arm toward said second gear along the axis, and a second crank that is connected to the other end of said crank shaft;
   a driving sprocket having an inner side surface facing said axial hole and an outer side surface opposite to said inner side surface along the axis and facing said first crank, and formed with a receiving groove that extends from said outer side surface toward said inner side surface, and that receives at least a portion of said extending portion of said first crank therein, and an engaging hole that extends from said inner side surface toward said receiving groove, that is in spatial communication with said receiving groove, that non-rotatably engages said engaging portion, and that has a diameter smaller than that of said receiving groove; and
   a unidirectional bearing mounted in said receiving groove and sleeved on said extending portion of said first crank for driving rotation of said driving sprocket in a single direction by said extending portion.

2. The bicycle as claimed in claim 1, wherein said driving sprocket includes a positioning seat sleeved co-rotatably on a portion of said second gear, and formed with said inner side surface, said outer side surface, said receiving groove and said engaging hole, and a sprocket plate connected fixedly to said positioning seat.

3. The bicycle as claimed in claim 2, wherein said frame further includes a seat tube defining said compartment, and a bottom bracket tube intersecting said seat tube, defining said axial hole, and having a first end surface that faces said first crank and that is disposed adjacent to said positioning seat, and a second end surface that is opposite to said first end surface along the axis and that faces said second crank, said engaging portion of said second gear being exposed outwardly of said axial hole and extending into said engaging hole in a direction away from said first end surface.

4. The bicycle as claimed in claim 1, wherein said crank shaft of said crank unit includes a first connecting portion corresponding in position to said receiving groove and connected co-rotatably to said extending portion of said first crank, and a second connecting portion opposite to said first connecting portion along the axis.

5. The bicycle as claimed in claim 1, wherein said engaging portion of said second gear has a non-circular profile complementary to that of said engaging hole of said driving sprocket.

* * * * *